United States Patent
Kobatake et al.

(10) Patent No.: US 9,729,376 B2
(45) Date of Patent: Aug. 8, 2017

(54) RECEPTION APPARATUS AND FREQUENCY ERROR CORRECTION METHOD

(71) Applicant: Panasonic Corporation, Osaka (JP)

(72) Inventors: Hisateru Kobatake, Osaka (JP); Ippei Kanno, Kyoto (JP); Yoshinobu Matsumura, Osaka (JP); Teruaki Hasegawa, Osaka (JP); Shigeru Soga, Kanagawa (JP); Kouya Watanabe, Osaka (JP)

(73) Assignee: PANASONIC CORPORATION, Osaka (JP)

( * ) Notice: Subject to any disclaimer, the term of this patent is extended or adjusted under 35 U.S.C. 154(b) by 0 days.

(21) Appl. No.: 14/654,993

(22) PCT Filed: Nov. 29, 2013

(86) PCT No.: PCT/JP2013/007034
§ 371 (c)(1),
(2) Date: Jun. 23, 2015

(87) PCT Pub. No.: WO2014/103171
PCT Pub. Date: Jul. 3, 2014

(65) Prior Publication Data
US 2015/0349999 A1 Dec. 3, 2015

(30) Foreign Application Priority Data
Dec. 26, 2012 (JP) ................. 2012-282730

(51) Int. Cl.
*H04L 27/26* (2006.01)
*H04B 1/10* (2006.01)
*H04W 56/00* (2009.01)

(52) U.S. Cl.
CPC ....... *H04L 27/2657* (2013.01); *H04B 1/1018* (2013.01); *H04B 1/1081* (2013.01);
(Continued)

(58) Field of Classification Search
CPC ............ H04L 27/2657; H04L 27/2675; H04L 27/2691; H04W 56/005; H04B 1/1081; H04B 1/1018
See application file for complete search history.

(56) References Cited

U.S. PATENT DOCUMENTS

| 6,658,063 | B1 | 12/2003 | Mizoguchi et al. |
| 2004/0120412 | A1* | 6/2004 | Banerjea ............ H04L 27/2657 375/260 |

(Continued)

FOREIGN PATENT DOCUMENTS

| JP | 07-273733 A | 10/1995 |
| JP | 2001-136149 A | 5/2001 |

(Continued)

OTHER PUBLICATIONS

International Search Report for Application No. PCT/JP2013/007034 dated Jan. 14, 2014.

(Continued)

*Primary Examiner* — Jung Park
(74) *Attorney, Agent, or Firm* — Pearne & Gordon, LLP

(57) ABSTRACT

Provided is an OFDM reception apparatus that can reduce, even in an environment where the influence of noises is strong, this influence of the noises, thereby improving the precision of detecting a carrier frequency error. In this apparatus, a filtering unit (151) receives received signals each including a short preamble (STF) in which a plurality of pilot subcarriers are intermittently arranged in the frequency domain and repeatedly arranged in the time domain, and the filtering unit (151) attenuates the frequency components between respective two adjacent ones of the plurality of pilot subcarriers in the frequency domain. A correction unit (154) corrects a carrier frequency error of the received (Continued)

signal on the basis of the signals of the plurality of pilot subcarriers having passed through the filtering unit (151).

7 Claims, 9 Drawing Sheets

(52) U.S. Cl.
CPC ...... *H04L 27/2675* (2013.01); *H04L 27/2691* (2013.01); *H04W 56/005* (2013.01)

(56) References Cited

U.S. PATENT DOCUMENTS

| | | | |
|---|---|---|---|
| 2005/0213689 A1 | 9/2005 | Matsuda et al. | |
| 2006/0176802 A1* | 8/2006 | Ko | H04L 27/2657 370/208 |
| 2007/0183370 A1 | 8/2007 | Wallace et al. | |
| 2008/0089443 A1 | 4/2008 | Sanada et al. | |
| 2009/0147900 A1* | 6/2009 | Lee | H04L 7/042 375/362 |
| 2009/0190686 A1* | 7/2009 | Cheong | H04B 7/0413 375/267 |
| 2012/0114019 A1 | 5/2012 | Wallace et al. | |
| 2012/0127978 A1 | 5/2012 | Wallace et al. | |

FOREIGN PATENT DOCUMENTS

| | | |
|---|---|---|
| JP | 2005-260337 A | 9/2005 |
| JP | 2008-236704 A | 10/2008 |
| JP | 2009-519689 A | 5/2009 |
| JP | 2011-101234 A | 5/2011 |

OTHER PUBLICATIONS

Sanada et al., "Frequency Offset Estimation Scheme in the Presence of Time• varying DC Offset for OFDM Direct Conversion Receivers", IEICE Technical Report, Nov. 22, 2006 (Nov. 22, 2006), vol. 106, No. 395, pp. 59 to 65, SR2006-50.

Morikura et al., "802.11 High Speed, Fast Wireless LAN Textbook," Impress R&D, Apr. 11, 2008, p. 212-213.

\* cited by examiner

RECEPTION APPARATUS AND FREQUENCY ERROR CORRECTION METHOD

TECHNICAL FIELD

The present disclosure relates to a receiving apparatus and a frequency error correction method.

BACKGROUND ART

Standardization efforts for the wireless LAN standard in IEEE 802.11 so far have mainly targeted indoor communication and has successively added physical layer standards mainly focusing on an increase in transmission capacity such as 802.11b (maximum 11 Mbps), 802.11a, 11g (maximum 54 Mbps), 802.11n (maximum 600 Mbps), and 802.11ac (maximum 6.9 Gbps). Meanwhile, as examination of smart meters to implement a smart grid has been well under way, the need for low rate and long-distance outdoor transmission is also increasing. There are also ongoing discussions about assignment of available specified low power radio frequencies and the like intended for such applications. Against this background, studies aiming at development of new communication standards using a sub GHz band (frequency band slightly lower than 1 GHz) have started and IEEE802.11 started up TGah (802.11ah), a task group working on wireless LAN standards using sub GHz frequency bands in 2010. A principal required specification in TGah (802.11ah) is "data rate of 100 kbps or higher and maximum transmission distance of 1 km."

IEEE 802.11a and subsequent standards including TGah (802.11ah) using an OFDM modulation scheme establish various kinds of synchronization using a preamble at the beginning of a packet to perform burst communication. A preamble is constructed of an STF (Short Training Field, which may also be called "short preamble") used for AGC (Automatic Gain Control) or coarse adjustment AFC (Automatic Frequency Control) and LTF (Long Training Field, which may also be called "long preamble") used for estimation of fine adjustment AFC or transmission path characteristic. In the STF, ten STS (Short Training Symbol) symbols are repeatedly mapped in the time domain and in the LTF, two LTS (Long Training Symbol) symbols are repeatedly mapped in the time domain.

In digital transmission such as OFDM, a carrier frequency generated on the receiving side normally does not match a carrier frequency on the transmitting side, and therefore, the receiving side needs to detect an error (carrier frequency error) in the carrier frequency and perform AFC for correcting the carrier frequency. The carrier frequency error appears as phase rotation of constellation of a received signal for each sample.

For example, NPL 1 discloses a method for performing AFC using a preamble made up of an STF and an LTF as a scheme for detecting/correcting carrier frequency errors in 802.11a. More specifically, this method calculates an auto-correlation between a received signal and a signal obtained by causing the received signal to delay by a repetition period (time corresponding to 1 symbol) using repetition mapping of an STF or LTF, calculates an angle component (phase component) of the signal obtained, and thereby detects a carrier frequency error.

FIG. 9 illustrates a configuration of AFC section 10 to which the method disclosed in NPL 1 is applied.

Correlation calculation section 1 calculates a correlation using repetition mapping of STS. More specifically, correlation calculation section 1 calculates a correlation between an STS at a certain time in the STF and an STS delayed by a repetition period (time corresponding to 1 STS). Detection section 2 detects a phase component obtained from the correlation result of correlation calculation section 1 as a phase rotation amount after a lapse of time corresponding to the repetition period, that is, a carrier frequency error. Correction section 3 corrects the carrier frequency using the carrier frequency error obtained in detection section 2.

Here, a general carrier frequency error detection method (processing by correlation calculation section 1 and detection section 2) will be described. Here, of STSs repeatedly mapped, an n-th STS is expressed by equation 1 or 2. In equation 1, $A_n$ denotes amplitude of an STS.

[1]

$$STS_n = A_n \exp(j2\pi ft) \quad n=0,1,2, \qquad \text{(Equation 1)}$$

[2]

$$a_n(t) = STS_n \qquad \text{(Equation 2)}$$

In this case, an STS delayed by repetition period S (time corresponding to 1 STS) with respect to the n-th STS ($STS_n$) corresponds to an (n+1)th STS ($STS_{n+1}$) as shown in equation 3.

[3]

$$a_n(t+S) = STS_{n+1} \qquad \text{(Equation 3)}$$

Here, for example, when a carrier frequency error resulting from a phase rotating by a phase amount δ [degree] every lapse of a time of period S is included in a received signal, $STS_n$ shown in equation 1 is expressed by following equation 4.

(Equation 4)

$$STS_n = A_n \exp\left(j2\pi ft + 2\pi \frac{n\delta}{360}\right) \qquad [4]$$
$$n = 0, 1, 2, \ldots, 9$$

Thus, the result of calculation of an auto-correlation between the n-th STS ($STS_n$) and the (n+1)th STS ($STS_{n+1}$) (complex multiplication of the $STS_n$ by a complex conjugate of the $STS_{n+1}$ or complex multiplication of the $STS_{n+1}$ by a complex conjugate of the $STS_n$) is expressed by equation 5.

(Equation 5)

$$STS_{n+1} * STS_n^* = \qquad [5]$$
$$A_{n+1}\exp\left(j2\pi ft + 2\pi\frac{(n+1)\delta}{360}\right) * A_n\exp\left(-j2\pi ft - 2\pi\frac{n\delta}{360}\right) =$$
$$A_{n+1}A_n\exp\left(2\pi\frac{\delta}{360}\right)$$

By extracting the phase component (angle component) in the correlation calculation result shown in equation 5, a phase rotation amount δ after a lapse of time, that is, a carrier frequency error is detected.

A general method for detecting a carrier frequency error has been described so far.

PTL 1 discloses a method for detecting a carrier frequency error between the transmitting side and the receiving side using an initial packet at a start of communication and correcting the carrier frequency using the carrier frequency error at the time of receiving a subsequent packet.

CITATION LIST

Patent Literature

PTL 1
Japanese Unexamined Patent Application Publication (Translation of PCT Application) No. 2009-519689

Non Patent Literature

NPL 1
Masahiro Morikura, Shuji Kubota, "802.11 High Speed, Fast Wireless LAN Textbook," Impress R&D, p. 212-213

SUMMARY OF INVENTION

Technical Problem

However, according to the method in NPL 1, an error between phase components obtained in a correlation calculation increases due to the influence of noise under a reception environment where the influence of noise is large, and there is a problem that a carrier frequency error may not be detected accurately. Similarly, according to the method in PTL 1 as well, reception of an initial packet may fail under a reception environment where the influence of noise is large, and there is a problem that communication cannot start.

An object of the present disclosure is to provide a receiving apparatus and a frequency error correction method capable of reducing the influence of noise even under an environment where the influence of noise is large, and improving the accuracy of detecting a carrier frequency error.

Solution to Problem

A receiving apparatus according to an aspect of the present disclosure includes: a filtering section that receives a received signal including a short preamble in which a plurality of pilot subcarriers are intermittently mapped in a frequency domain and repeatedly mapped in a time domain and that attenuates a frequency component between two adjacent pilot subcarriers in the frequency domain of the plurality of pilot subcarriers; and a correction section that corrects a carrier frequency error in the received signal based on signals of the plurality of pilot subcarriers that have passed through the filtering section.

A frequency error correction method according to an aspect of the present disclosure includes: performing filtering that receives a received signal including a short preamble in which a plurality of pilot subcarriers are intermittently mapped in a frequency domain and repeatedly mapped in a time domain and that attenuates, a frequency component between two adjacent pilot subcarriers in the frequency domain of the plurality of pilot subcarriers; and correcting a carrier frequency error in the received signal based on signals of the plurality of pilot subcarriers after the filtering.

Advantageous Effects of Invention

According to the present disclosure, it is possible to reduce the influence of noise even under an environment where the influence of noise is large, and improve accuracy of detecting a carrier frequency error.

DESCRIPTION OF EMBODIMENTS

Hereinafter, embodiments of the present disclosure will be described in detail with reference to the accompanying drawings.

Figure 1:
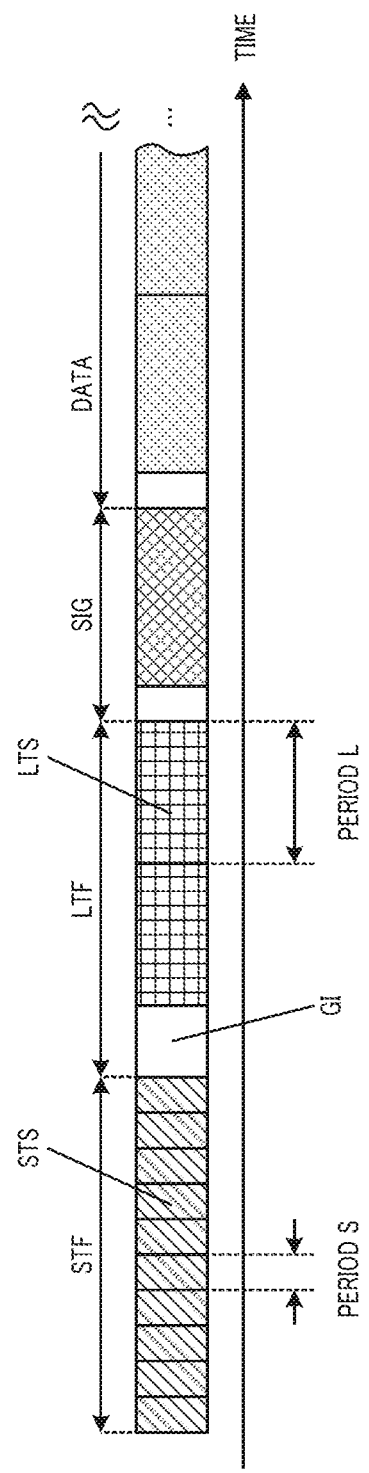
FIG. 1 is a diagram illustrating an example of a packet configuration according to each embodiment of the present disclosure.

FIG. 1 illustrates a packet configuration in a time domain of 802.11a. As shown in FIG. 1, in a short preamble (STF) at the beginning, ten STSs (fixed patterns) of period S are repeatedly mapped. In a long preamble (LTF) that follows the short preamble, two LTSs (fixed patterns) of period L are repeatedly mapped. A guard interval (GI) is added to an LTF section between the STS and LTS. A region (SIG) for transmitting information (modulation scheme or the like) to demodulate a payload (DATA) portion is mapped after the long preamble and a region for transmitting a payload (DATA) after the SIG. Note that with 802.11ah, although there is a possibility that the number of times each portion is repeated, 802.11ah basically uses the same configuration as the packet configuration of 802.11a shown in FIG. 1.

Figure 2:
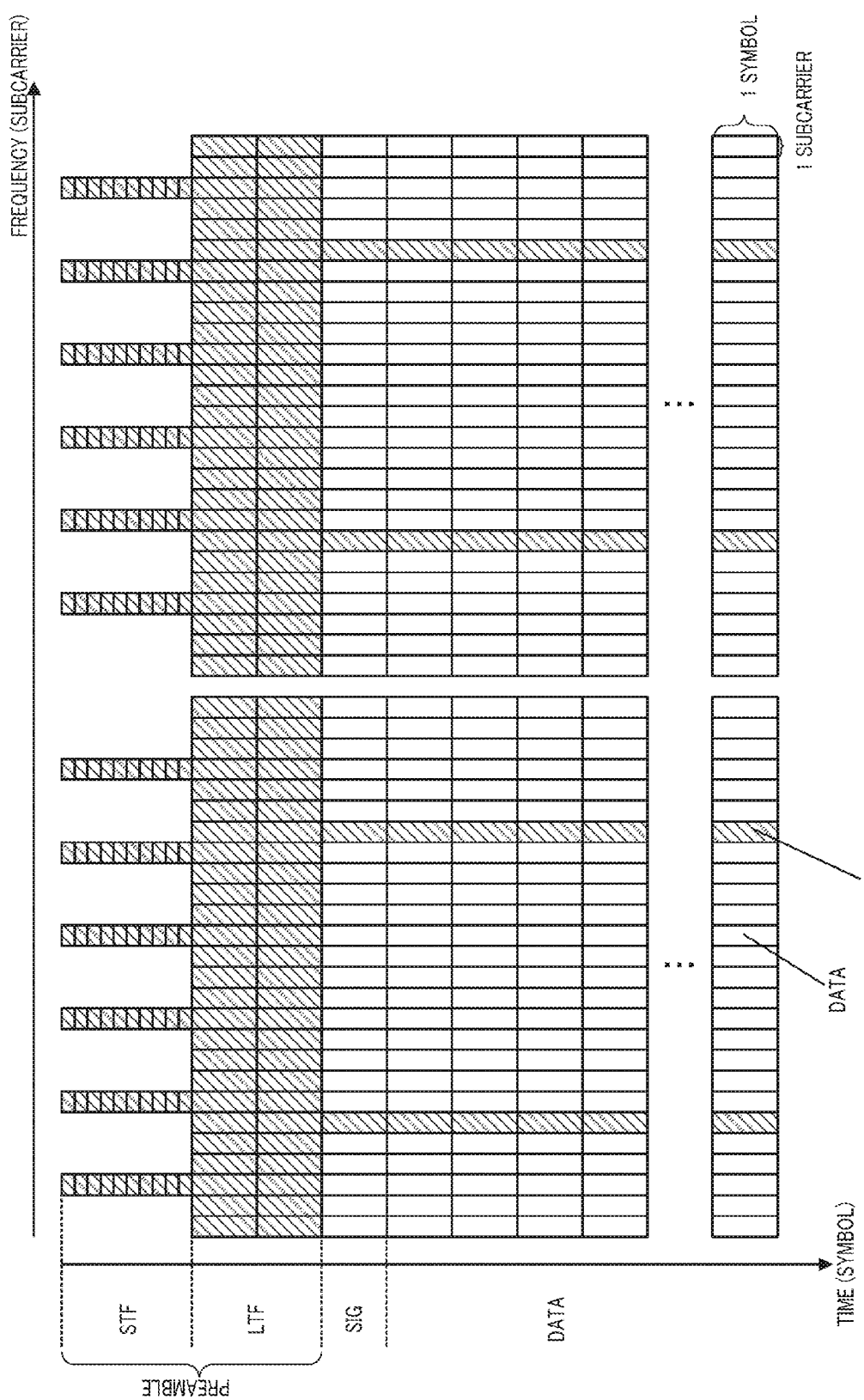
FIG. 2 is a diagram illustrating an example of subcarrier mapping of OFDM symbols according to each embodiment of the present disclosure.

FIG. 2 illustrates an example of subcarrier mapping of an OFDM symbol making up an 802.11a packet. In FIG. 2, the horizontal axis denotes a subcarrier direction corresponding to a frequency domain and the vertical axis represents a symbol direction corresponding to a time domain. In FIG. 2, hatched blocks denote resources having predetermined amplitudes and phases to which pilot signals known to transmitting and receiving sides are assigned and white blocks denote resources to which data is assigned.

As shown in FIG. 2, in the STF, pilot signals multiplexed at 4-subcarrier intervals, each of which includes 10 continuous STSs, each STS having ¼ time of an effective symbol length which corresponds to a time for two data symbols. In the LTF, pilot signals are multiplexed with all subcarriers except a subcarrier of a DC component in the center (DC subcarrier), and in "SIG" and "DATA," pilot signals are multiplexed with specific subcarriers and control signals or data signals are multiplexed with subcarriers other than the subcarriers to which the above-described pilot signals are assigned.

Figure 3A:
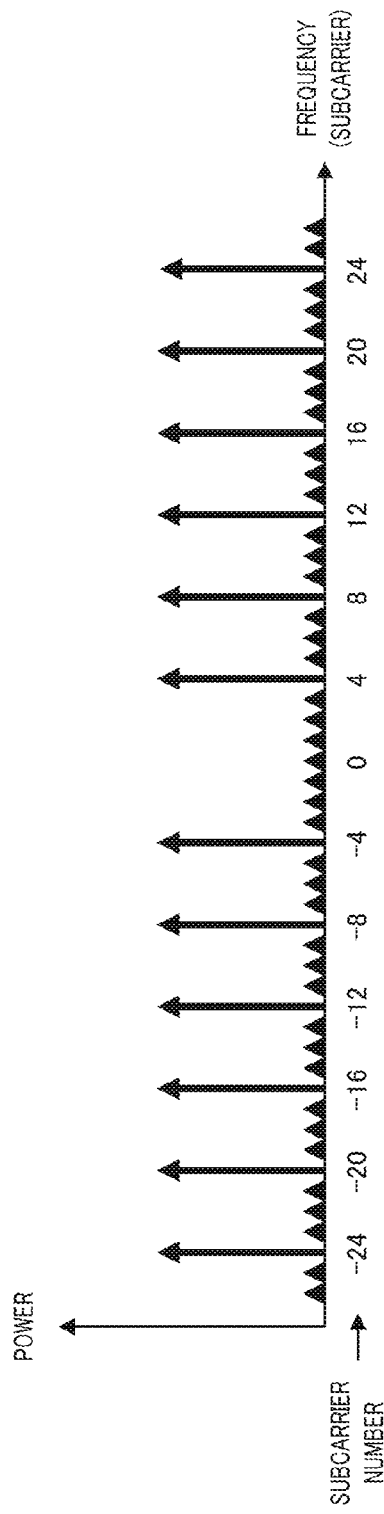
FIGS. 3A and 3B are diagrams illustrating receiving power of subcarriers in each symbol according to each embodiment of the present disclosure.
Figure 3B:
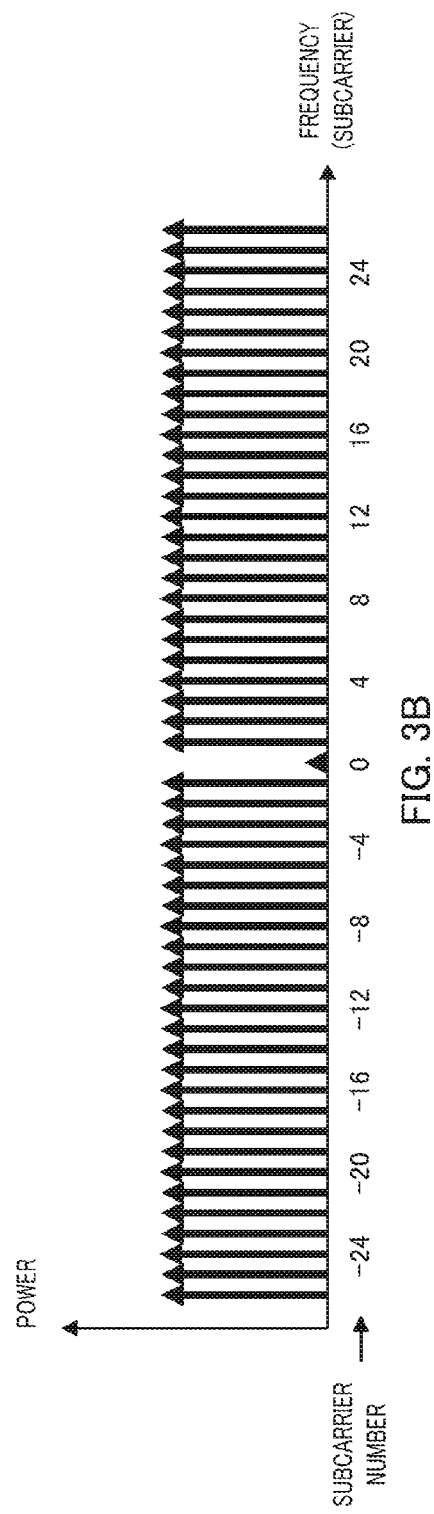

FIG. 3A illustrates subcarrier mapping in the STF and FIG. 3B illustrates subcarrier mapping in a symbol other than the STF (LTF, SIG, DATA). As shown in FIG. 3A, in the STF, subcarriers used for transmission of pilot signals (hereinafter referred to as "pilot subcarriers") are mapped at four-carrier intervals (except DC subcarrier). That is, in the STF, pilot subcarriers are mapped intermittently. Furthermore, subcarriers not used for transmission of signals are mapped between the pilot subcarriers (hereinafter referred to as "null subcarriers"). That is, the STF includes a plurality of pilot subcarriers and a plurality of null subcarriers which are alternately mapped in a transmission band at predetermined frequency intervals.

In contrast, as shown in FIG. 3B, in a symbol other than the STF, all subcarriers (except subcarrier of a DC component) are used for transmission of a signal (data signal, control signal or pilot signal).

Figure 4:
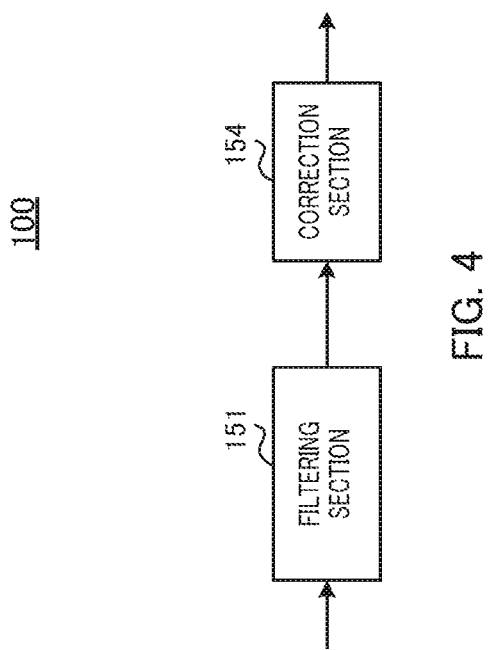
FIG. 4 is a block diagram illustrating a configuration of main parts of an OFDM receiving apparatus according to Embodiment 1 of the present disclosure.

FIG. 4 is a block diagram illustrating a configuration of main parts of OFDM receiving apparatus 100 according to the present embodiment. In OFDM receiving apparatus 100 shown in FIG. 4, filtering section 151 receives a received signal including a short preamble (STF) in which a plurality of pilot subcarriers are intermittently mapped in the frequency domain and repeatedly mapped in the time domain, and causes frequency components between two adjacent pilot subcarriers in the frequency domain to attenuate among a plurality of pilot subcarriers. Correction section 154 corrects a carrier frequency error of the received signal based on signals of a plurality of pilot subcarriers that have passed through filtering section 151.

[Configuration of OFDM Receiving Apparatus 100]

Figure 5:
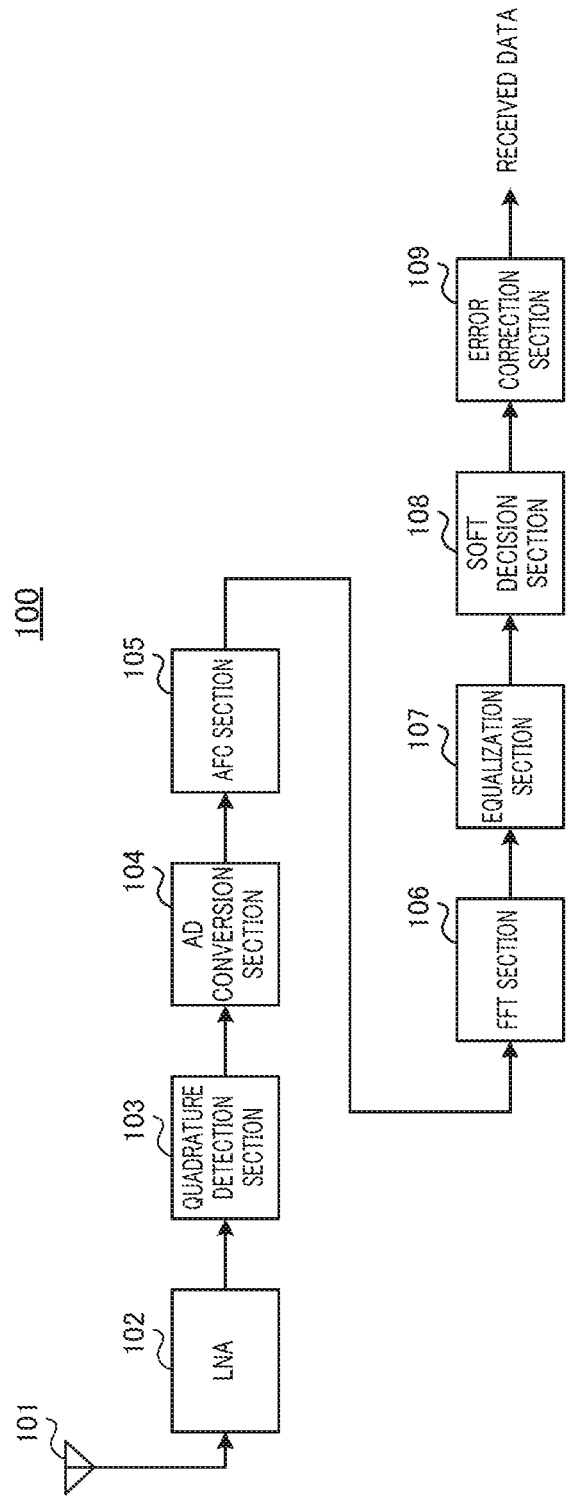
FIG. 5 is a block diagram illustrating a configuration of the OFDM receiving apparatus according to Embodiment 1 of the present disclosure.

FIG. 5 is a block diagram illustrating a configuration of OFDM receiving apparatus 100 according to the present embodiment. OFDM receiving apparatus 100 shown in FIG. 5 includes antenna 101, LNA (Low Noise Amplifier) 102, quadrature detection section 103, AD conversion section 104, AFC section 105, FFT (Fast Fourier Transform) section 106, equalization section 107, soft decision section 108, and error correction section 109.

LNA 102 receives a signal transmitted from an OFDM transmitting apparatus (not shown) (see FIG. 1 or FIG. 2) via antenna 101, applies amplification at a predetermined level to the received signal and outputs the amplified signal to quadrature detection section 103.

Quadrature detection section 103 performs quadrature-coherent detection on the signal received from LNA 102 at a predetermined frequency and outputs an OFDM signal mapped on a desired reception channel as a complex baseband signal (analog signal) to AD conversion section 104.

AD conversion section 104 converts the complex baseband signal (analog signal) received from quadrature detection section 103 to a digital signal and outputs the digital complex baseband signal to AFC section 105.

AFC section 105 detects a carrier frequency error of the complex baseband signal using an STF signal of the complex baseband signal received from AD conversion section 104. Next, AFC section 105 applies carrier frequency correction to the complex baseband signal based on the detected carrier frequency error and outputs the corrected complex baseband signal to FFT section 106. Note that details of the method for detecting the carrier frequency error in AFC section 105 will be described later.

FFT section 106 applies Fourier transform from a time domain to a frequency domain to the signal obtained by extracting a portion corresponding to an effective OFDM symbol period at a predetermined window position of the complex baseband signal received from AFC section 105. FFT section 106 outputs the signal after the Fourier transform to equalization section 107.

Equalization section 107 applies amplitude and phase correction (equalization) to the data signal using a transmission path characteristic estimated from the signal received from FFT section 106 (e.g., pilot signal in the LTF) and outputs the signal after the equalization to soft decision section 108 as a demodulated data signal.

Soft decision section 108 makes a soft decision on the demodulated data signal received from equalization section 107.

Error correction section 109 corrects a transmission error according to a likelihood of the soft decision value received from soft decision section 108 and obtains received data.

[Operation of AFC Section 105]

Details of the method for detecting the carrier frequency error in AFC section 105 shown in FIG. 5 will be described.

Figure 6:
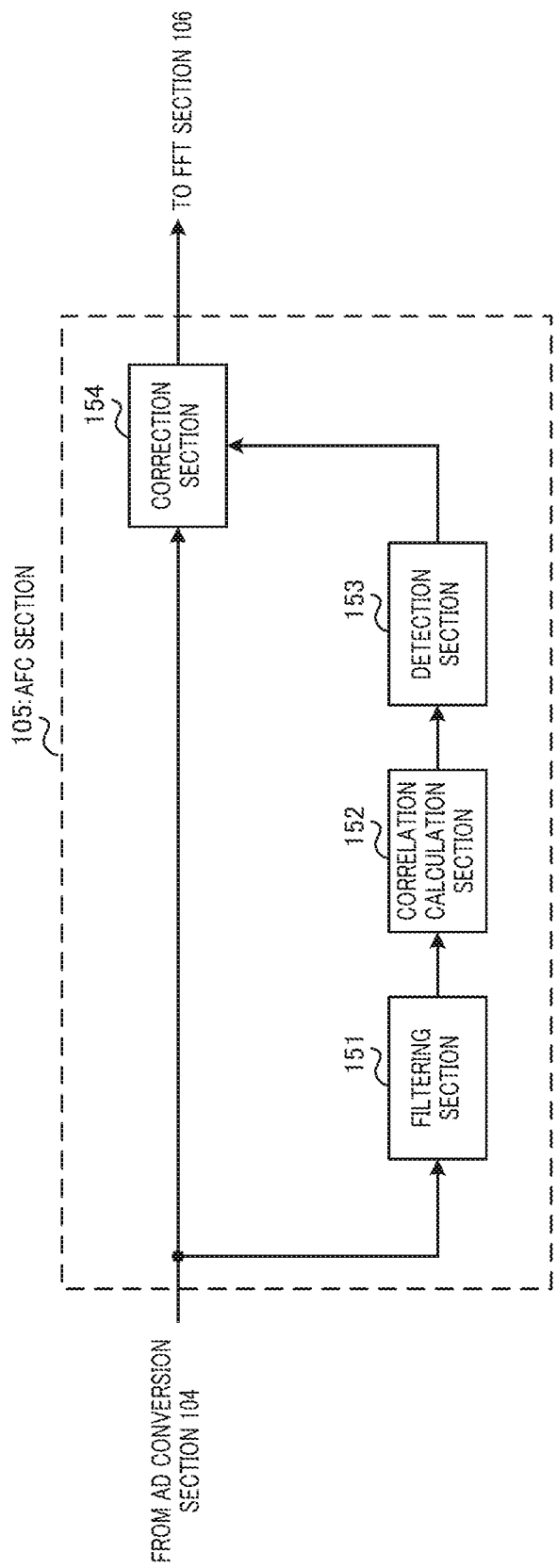
FIG. 6 is a block diagram illustrating an internal configuration of an AFC section according to Embodiment 1 of the present disclosure.
Figure 9:
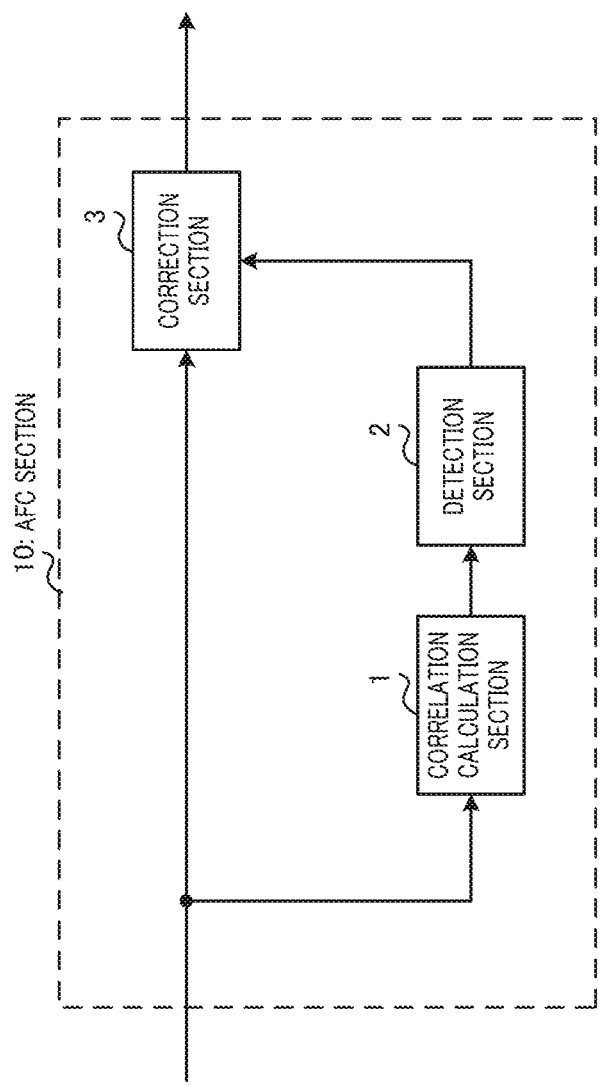
FIG. 9 is a block diagram illustrating an internal configuration of a conventional AFC section.

FIG. 6 is a block diagram illustrating an internal configuration of AFC section 105. AFC section 105 shown in FIG. 6 includes filtering section 151, correlation calculation section 152, detection section 153 and correction section 154. The operations of correlation calculation section 152, detection section 153 and correction section 154 are the same as the operations of correlation calculation section 1, detection section 2 and correction section 3 shown in FIG. 9.

In AFC section 105 shown in FIG. 6, the received signal (complex baseband signal) of the OFDM signal received via antenna 101 after the quadrature detection and AD conversion is inputted to correction section 154 and filtering section 151. That is, AFC section 105 is provided with a branch section that branches the complex baseband signal (received signal) received from AD conversion section 104, sends one branched received signal to filtering section 151 and sends the other branched received signal to correction section 154. The signal corrected by correction section 154 is outputted to FFT section 106.

More specifically, filtering section 151 in AFC section 105 performs filtering processing on the STF of the complex baseband signal received from AD conversion section 104. More specifically, filtering section 151 receives the complex baseband signal including the STF in which a plurality of pilot subcarriers are mapped intermittently in the frequency domain and mapped repeatedly in the time domain, and causes to attenuate, frequency components between every two adjacent pilot subcarriers of the plurality of pilot subcarriers in the frequency domain. In other words, filtering section 151 performs filtering processing that allows the signal components of pilot subcarriers in the STF to pass therethrough and reduces the signal components of subcarriers (null subcarriers) other than pilot subcarriers in the transmission band. For example, filtering section 151 is a comb filter.

Figure 7:
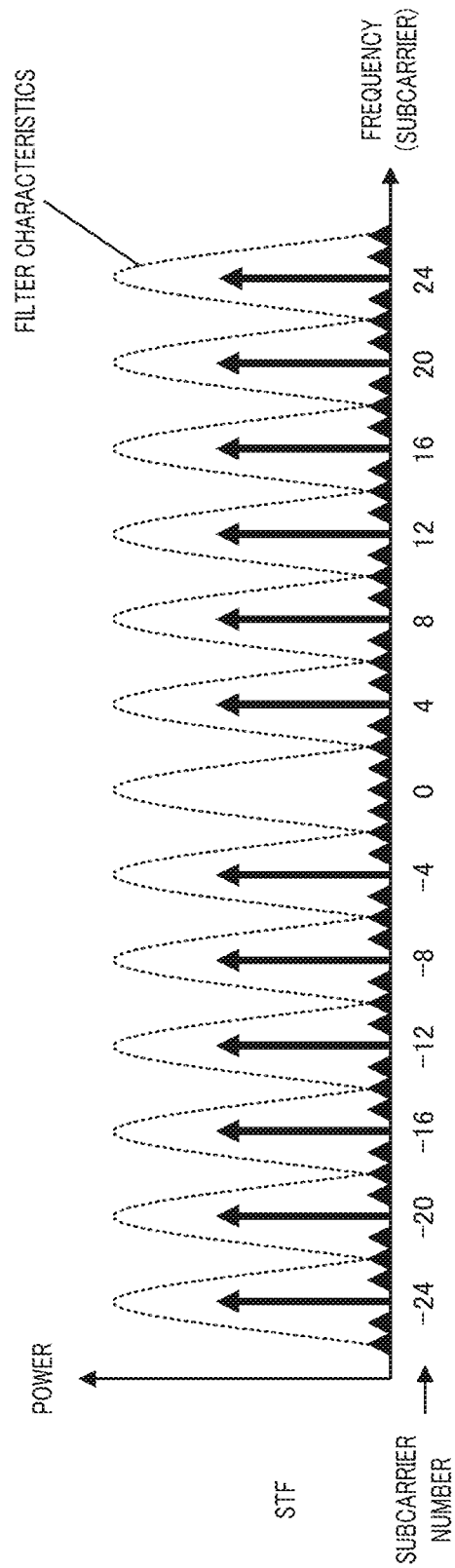
FIG. 7 is a diagram illustrating filtering in an STF according to Embodiment 1 of the present disclosure.

FIG. 7 illustrates an example of the filtering processing by filtering section 151. Subcarrier numbers of pilot subcarriers are −24, −20, −16, −12, −8, −4, 4, 8, 12, 16, 20, and 24 as shown in FIG. 7. As shown in FIG. 7, the filter characteristics of filtering section 151 are set so as to allow a signal component corresponding to a pilot subcarrier to pass through and to suppress a signal component of a subcarrier other than a pilot subcarrier (that is, a noise component).

Correlation calculation section 152 receives the signal that has passed through filtering section 151 and performs correlation calculation on the signals (STS) repeatedly mapped in the time domain. More specifically, correlation calculation section 152 calculates an auto-correlation between an STS at a certain time in the STF and an STS delayed by repetition period S. As described above, correlation calculation section 152 can perform correlation calculation using a signal whose signal component other than a pilot subcarrier in the STF is suppressed. This reduces an error between a phase component (angle component) of a correlation calculation result due to the influence of a signal component (noise component) of a subcarrier other than pilot subcarriers.

Detection section 153 detects a carrier frequency error of the received signal based on the correlation calculation result in correlation calculation section 152. More specifically, detection section 153 detects the phase component of the correlation result in correlation calculation section 152 as a carrier frequency error (phase rotation amount).

Correction section 154 corrects the carrier frequency using the carrier frequency error obtained in detection section 153. That is, correction section 154 corrects the carrier frequency error of the received signal based on the signals of a plurality of pilot subcarriers that have passed through filtering section 151.

Figure 8:
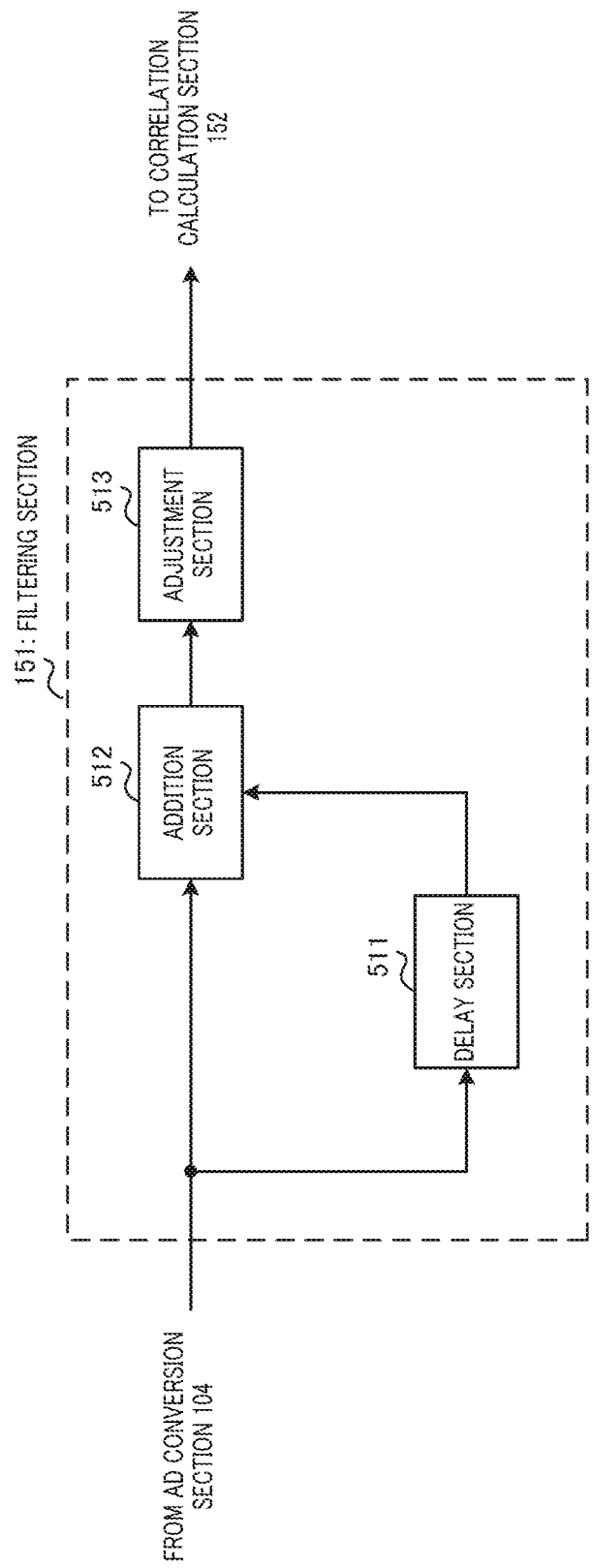
FIG. 8 is a block diagram illustrating an internal configuration of a filtering section according to Embodiment 1 of the present disclosure.

Next, FIG. 8 is a block diagram illustrating an internal configuration of filtering section 151 using a comb filter. Filtering section 151 shown in FIG. 8 includes delay section 511, addition section 512 and adjustment section 513.

Delay section 511 in filtering section 151 causes an inputted signal (that is, signal after quadrature detection of an OFDM signal) to delay. More specifically, delay section 511 causes the signal received from AD conversion section 104 to delay by period S (time corresponding to 1 symbol in the short preamble) and outputs the delayed signal to addition section 512.

Addition section 512 adds up the delayed signal from delay section 511 and the signal before the delay. More specifically, addition section 512 adds up an STS in the STF of the signal received from AD conversion section 104 and an STS in the STF of the delayed signal received from delay section 511 and outputs the addition result to adjustment section 513. That is, addition section 512 adds up an n-th STS ($STS_n$) and an (n+1)-th STS ($STS_{n+1}$).

Adjustment section 513 adjusts the amplitude (gain) of the addition result received from addition section 512 and outputs the adjusted signal (that is, signal after filtering) to correlation calculation section 152.

Here, in the STF, a plurality of pilot subcarriers are intermittently mapped at 4-subcarrier intervals in the frequency domain and ten STSs each having a symbol length of ¼ time of the effective symbol length (corresponding to period S) are repeatedly mapped (see FIG. 2). Thus, by setting the delay time of the received signal in delay section 511 to a time corresponding to period S, the filter characteristics of the comb filter become characteristics in which peaks appear at four-subcarrier intervals (interval of two adjacent pilot subcarriers) as shown in FIG. 7.

The filtering processing of filtering section 151 shown in FIG. 8 is expressed by following equation 6.

(Equation 6)

$$b(t) = \frac{1}{2}\{f(t) + f(t+S)\} = \frac{1}{2}\{STS_n + STS_{n+1}\} \quad [6]$$
$$n = 0, 1, 2, \ldots, 8$$

In equation 6, b(t) denotes a signal after filtering in the n-th STS ($STS_n$).

Generally, performing the calculation shown in equation 6 in the signal processing is equivalent to generating multipath interference for itself. However, when a phase rotation amount after a lapse of a time on the complex plane of the received signal (STS) is extracted as in the case of detection of a carrier frequency error in AFC section 105, there is no influence of the above-described multipath interference. Hereinafter, a detailed description will be given of the fact that there is no influence of the above-described multipath interference due to filtering when detecting a carrier frequency error. An assumption is made that the amplitude of each repeatedly mapped STS is equal (that is, equation 7 is satisfied).

[7]

$$A_n = A_{n+1} = A_{n+2} \quad \text{(Equation 7)}$$

A calculation of a correlation between the n-th STS ($STS_n$) and the (n+1)th STS ($STS_{n+1}$) in the STF after filtering by filtering section 151 is expressed by equation 8.

(Equation 8)

$$\begin{aligned}
b(t+S)*b(t)^* &= \frac{1}{2}\{STS_{n+1} + STS_{n+2}\} * \frac{1}{2}\{STS_n + STS_{n+1}\}^* \quad [8]\\
&= \frac{1}{4}(STS_{n+1}*STS_n^* + STS_{n+1}*STS_{n+1}^* + \\
&\quad STS_{n+2}*STS_n^* + STS_{n+2}*STS_{n+1}^*)\\
&= \frac{1}{4}\Big\{A_{n+1}\exp\Big(j2\pi ft + 2\pi\frac{(n+1)\delta}{360}\Big)*\\
&\quad A_n\exp\Big(-j2\pi ft - 2\pi\frac{n\delta}{360}\Big)+\\
&\quad A_{n+1}\exp\Big(j2\pi ft + 2\pi\frac{(n+1)\delta}{360}\Big)*\\
&\quad A_{n+1}\exp\Big(-j2\pi ft - 2\pi\frac{(n+1)\delta}{360}\Big)+\\
&\quad A_{n+2}\exp\Big(j2\pi ft + 2\pi\frac{(n+2)\delta}{360}\Big)*\\
&\quad A_n\exp\Big(-j2\pi ft - 2\pi\frac{n\delta}{360}\Big)+\\
&\quad A_{n+2}\exp\Big(j2\pi ft + 2\pi\frac{(n+2)\delta}{360}\Big)*\\
&\quad A_{n+1}\exp\Big(-j2\pi ft - 2\pi\frac{(n+1)\delta}{360}\Big)\Big\}\\
&= \frac{1}{4}\Big\{A_{n+1}A_n\exp\Big(2\pi\frac{\delta}{360}\Big) + A_{n+1}^2 +\\
&\quad A_{n+2}A_n\exp\Big(2\pi\frac{2\delta}{360}\Big)+\\
&\quad A_{n+2}A_{n+1}\exp\Big(2\pi\frac{\delta}{360}\Big)\Big\}\\
&= \frac{A_n^2}{4} * \exp\Big(2\pi\frac{\delta}{360}\Big)\Big\{1 + \exp\Big(-2\pi\frac{\delta}{360}\Big) +\\
&\quad \exp\Big(2\pi\frac{\delta}{360}\Big) + 1\Big\}\\
&= \frac{A_n^2}{4} * \exp\Big(2\pi\frac{\delta}{360}\Big)\Big\{2 + 2\cos\Big(2\pi\frac{\delta}{360}\Big)\Big\}\\
&= A_n^2 * B * \exp\Big(2\pi\frac{\delta}{360}\Big)
\end{aligned}$$

As shown in equation 8, a phase rotation amount δ appears in the phase component in the correlation calculation result using the STF after filtering by the comb filter as in the case of equation 5. That is, it can be seen that even when a correlation calculation is performed on the filtered STS, the carrier frequency error δ can be obtained by extracting the phase component (angle component). That is, even when detecting a carrier frequency error after applying filtering (comb filter) to the STF, AFC section 105 can detect a carrier frequency error without being affected by multipath interference or the like caused by the filtering.

Furthermore, as described above, in the STF, pilot subcarriers are mapped at 4-subcarrier intervals and subcarriers other than pilot subcarriers are null subcarriers. That is, three null subcarriers are mapped on both sides of each pilot subcarrier. In contrast, in a symbol other than the STF (e.g., FIG. 3B), subcarriers to which signals are assigned are consecutively mapped. That is, the interval of pilot subcarriers in each symbol of the STF is wider than the interval of subcarriers used for transmission of a symbol other than STS. Thus, as shown in FIG. 7, by performing filtering processing that allows signal components of pilot subcarriers to pass through, even when signal components are suppressed in subcarriers peripheral to the pilot subcarriers, there is no influence on other signals. In other words, in the STF, noise components are included as signal components of subcarriers peripheral to pilot subcarriers whose signal components have passed through the filter by the filtering processing. Thus, OFDM receiving apparatus 100 can suppress noise components without causing the reception performance to deteriorate in the filtering processing on the STF.

As shown in FIG. 8, using the comb filter having a simple configuration including delay section 511, addition section 512 and adjustment section 513, it is possible to reduce signal components (noise components) between pilot subcarriers in the STF.

Thus, according to the present embodiment, OFDM receiving apparatus 100 detects a carrier frequency error using the STF using filtering which allows components of pilot subcarriers to pass through. By so doing, it is possible to suppress noise components between pilot subcarriers even under a reception environment where the influence of noise is large, and as a result, it is possible to prevent errors of phase components (angle components) obtained through correlation calculation from increasing. Thus, according to the present embodiment, it is possible to reduce the influence of noise even under an environment where the influence of noise is large, to improve detection accuracy of a carrier frequency error and also to improve accuracy of AFC.

In the present embodiment, a description has been given of the case where a received signal (STS) is delayed by repetition period S in an auto-correlation calculation (that is, delay amount of a time shift: 1 symbol). However, the delay amount of a time shift of a received signal in auto-correlation calculation is not limited to 1 symbol, but may also be N symbols (N is a natural number equal to or smaller than the repetition count, for example, repetition count=10 in FIG. 2).

The present embodiment has described auto-correlation calculation carried out using a received signal and a signal obtained by time-shifting (delaying) the received signal as the correlation calculation carried out by correlation calculation section 152. However, the correlation calculation carried out by correlation calculation section 152 is not limited to this, and for example, when a preamble signal used for AFC is known between transmission and reception, the correlation calculation may also be a cross-correlation between a pattern of preamble signals of the received signal and a pattern of preamble signals generated on the receiving side.

A case has been described where a comb filter is used as an example of filtering section 151 described in the present embodiment. However, the method for implementing filtering section 151 is not necessarily limited to the case where the comb filter is used, but may be filtering that allows signal components of pilot subcarriers to pass therethrough and reduces signal components of null subcarriers other than pilot subcarriers.

A case has been described in the above embodiment where an 802.11 transmission format (FIG. 2) is used. However, the transmission format in the above embodiment needs to include a preamble made up of a pilot subcarrier and a null subcarrier, and not limited to the 802.11 transmission format.

The above embodiment has described a configuration in which AD conversion section 104 is provided after quadrature detection section 103 (configuration in which AD conversion is performed after quadrature detection) in FIG. 5, but without being limited to this, a configuration in which quadrature detection is performed after AD conversion may also be adopted. Furthermore, a configuration provided with a demapping section, a deinterleaving section and an error correction section may also be used as a configuration after equalization section 107 shown in FIG. 5.

Each function element (function block) of the OFDM receiving apparatus employed in the description of the aforementioned embodiment may typically be implemented as an LSI constituted by an integrated circuit. These may be individual chips or partially or totally contained on a single chip. "LSI" is adopted here but this may also be referred to as "IC," "system LSI," "super LSI," or "ultra LSI" depending on differing extents of integration.

Further, the method of circuit integration is not limited to LSI's, and implementation using dedicated circuitry or general purpose processors is also possible. After LSI manufacture, utilization of a programmable FPGA (Field Programmable Gate Array) or a reconfigurable processor where connections and settings of circuit cells within an LSI can be reconfigured is also possible.

Further, if integrated circuit technology comes out to replace LSI's as a result of the advancement of semiconductor technology or a derivative other technology, it is naturally also possible to carry out function block integration using this technology. Application of biotechnology is also possible.

At least part of the procedure of operation of the OFDM receiving apparatus shown in the above-described embodiments may be written in a program so that, for example, a CPU (Central Processing Unit) may read and execute the program stored in a memory or the program may be stored in a recording medium and distributed, for example.

The OFDM receiving apparatus of the above-described embodiments may be implemented using a reception method that performs at least part of the described reception processing.

The above-described embodiments may also be implemented by combining any receiving apparatus, reception method, reception circuit or program that performs part of the reception processing that implements the above-described embodiments. For example, part of the configuration of the receiving apparatus described in the above-described embodiments may be implemented by a receiving apparatus or integrated circuit, a procedure of operation to be performed by the configuration except the part may be written in a reception program and, for example, a CPU may read and execute the program stored in a memory.

The disclosure of Japanese Patent Application No. 2012-282730, filed on Dec. 26, 2012, including the specification, drawings and abstract is incorporated herein by reference in its entirety.

INDUSTRIAL APPLICABILITY

The present disclosure is applicable to a communication system using a preamble including a short preamble and is useful to correct deterioration in reception performance due to the influence of frequency selective interference caused by leakage power of an adjacent channel or the like.

REFERENCE SIGNS LIST

100 OFDM receiving apparatus
101 Antenna
102 LNA
103 Quadrature detection section
104 AD conversion section
105 AFC section
106 FFT section
107 Equalization section
108 Soft decision section
109 Error correction section
151 Filtering section
152 Correlation calculation section
153 Detection section
154 Correction section
511 Delay section
512 Addition section
513 Adjustment section

The invention claimed is:

1. A receiving apparatus comprising:
    filtering circuitry which, in operation, receives a reception signal including a short preamble, the short preamble including a plurality of pilot subcarriers and a plurality of null subcarriers which are alternately mapped in a transmission band at predetermined frequency intervals, wherein the plurality of pilot subcarriers are intermittently mapped in a frequency domain and repeatedly mapped in a time domain; and
    correction circuitry which, in operation, corrects a carrier frequency error in the reception signal based on the plurality of pilot subcarriers out of the filtered reception signal,
    wherein the filtering circuitry allows signal components of the pilot subcarriers in the short preamble to pass therethrough and suppresses signal components of the null subcarriers in the transmission band.

2. The receiving apparatus according to claim 1, further comprising:
    correlation calculation circuitry which, in operation, receives the filtered reception signal and that carries out correlation calculation on the plurality of pilot subcarriers which are repeatedly mapped in the time domain; and
    error detection circuitry which, in operation, detects the carrier frequency error in the reception signal based on a result of the correlation calculation, wherein
    the correction circuitry corrects the carrier frequency error according to the detection result of the error detection circuitry.

3. The receiving apparatus according to claim 1, wherein the filtering circuitry is a comb filter comprising:
    delay circuitry which, in operation, causes the reception signal to delay;
    addition circuitry which, in operation, adds up the reception signal and the delayed part of reception signal; and
    adjustment circuitry which, in operation, adjusts a gain of the result of the addition circuitry.

4. The receiving apparatus according to claim 3, wherein:
    the reception signal is an quadrature detected OFDM signal, and
    the delay circuitry causes the reception signal to delay by a time corresponding to one symbol in the short preamble.

5. The receiving apparatus according to claim 1, further comprising:
    branch circuitry which, in operation, branches the reception signal, wherein one of the branched reception signals is outputted to the filtering circuitry and the other one of the reception signals is outputted to the correction circuitry.

6. The receiving apparatus according to claim 1, further comprising:
    antenna which, in operation, receives an OFDM signal;
    quadrature detection circuitry which, in operation, detects the received OFDM signal;
    AD conversion circuitry which, in operation, converts the detected OFDM signal as the reception signal and outputs the reception signal to the correction circuitry and the filtering circuitry; and
    Fourier transform circuitry which, in operation, performs Fourier transform on the corrected reception signal.

7. A frequency error correction method comprising:
    performing filtering, by filtering circuitry, that receives a reception signal including a short preamble, the short preamble including a plurality of pilot subcarriers and a plurality of null subcarriers which are alternately mapped in a transmission band at predetermined frequency intervals, wherein the plurality of pilot subcarriers are intermittently mapped in a frequency domain and repeatedly mapped in a time domain; and
    correcting, by correcting circuitry, a carrier frequency error in the reception signal based on signals of the plurality of pilot subcarriers out of the filtered reception signal,
    wherein the filtering circuitry allows signal components of the pilot subcarriers in the short preamble to pass therethrough and suppresses signal components of the null subcarriers in the transmission band.

* * * * *